Dec. 27, 1966   R. W. RILEY   3,294,447
SEAT BELT RETRACTOR
Filed Jan. 25, 1965   2 Sheets-Sheet 1

ROBERT W. RILEY
INVENTOR

BY John R. Faulkner
John J. Roethel
ATTORNEYS

Dec. 27, 1966  R. W. RILEY  3,294,447
SEAT BELT RETRACTOR

Filed Jan. 25, 1965 2 Sheets-Sheet 2

ROBERT W. RILEY
*INVENTOR*

BY John R. Faulkner
John J. Roethel
*ATTORNEYS*

United States Patent Office 3,294,447
Patented Dec. 27, 1966

3,294,447
SEAT BELT RETRACTOR
Robert W. Riley, Taylor, Mich., assignor to Ford Motor Company, Dearborn, Mich., a corporation of Delaware
Filed Jan. 25, 1965, Ser. No. 427,787
4 Claims. (Cl. 297—388)

This invention relates generally to retracting mechanisms for motor vehicle seat belts.

More particularly, the present invention relates to a retracting mechanism which provides for positive locking of a seat belt in extended position, and which further provides for retraction of the belt on a reel.

In its simplest form, a reel-type seat belt retractor mechanism comprises a rotatable shaft or reel from which the belt is adapted to be unwound when pulled across the body of an occupant of a vehicle seat. The shaft or reel is coupled to a spring which is wound up or placed under increased tension as the belt is pulled from the reel. Upon release of the free end of the belt from a coacting buckle device or anchoring means, the spring causes reverse rotation of the reel or shaft and the belt to be rewound or retracted on the reel. The major objection to simple spring-loaded reel retractor mechanisms is that the seat belt provides full restraint upon the seat occupant only when it has been fully extended from the reel. Frequently, the seat occupant, not realizing that the seat belt must be fully extended from the reel, discontinues his action of extending the belt as soon as he is able to buckle or engage the free end of the belt with the coacting buckle element or anchor device. The belt is then relatively ineffective as a restraining agent because full restraining force cannot be exerted until all of the belt still remaining on the reel has been unreeled.

If the seat occupant knows that the belt extending from the retractor mechanism must be fully extended for proper restraining action, he frequently finds that the belt is either too short or too long because of variations between his girth and that of the person who occupied the seat before him. Also, the effective length of the belt may vary because of the necessity of moving the seat in a fore or aft direction to accommodate proper positioning of the seat relative to the operating controls to satisfy the physical characteristics of the several users of the vehicle. Provision must then be made for adjustment of the belt length at the buckle element.

It is an object of the present invention to provide a seat belt retractor mechanism which permits automatic adjustment of the length of the belt as required so that the seat occupant at all times will be fully restrained in the seat. This is accomplished by incorporating in the retractor mechanism a locking device operative to hold the reel against rotation in unreeling direction as soon as a buckle element carried on the free end of the belt is engaged with a coacting buckle element or anchoring device. Also incorporated in the retractor mechanism is a spring-loaded reel constructed and arranged so that the take-up action of the reel remains effective at all times to retract the belt. Thus, if the belt is overextended as it is pulled across the body of the vehicle seat occupant, the belt upon release of the pulling force will be automatically retracted to provide snug engagement. Any attempt to unreel the belt from the reel will be resisted by the locking device as long as the buckle element on the free end of the belt is maintained in engagement with the buckle element or anchor device to which it is coupled. To extend the belt, it is necessary first to disengage the buckle element on the free end of the belt from the buckle device or anchor device.

The foregoing is accomplished by coupling a ratchet plate to the retractor mechanism reel shaft and by controlling rotation of the ratchet plate in unreeling direction by means of a pawl. The pawl in turn is coupled to a remote control cable which extends to a fixed buckle or anchor device adapted to receive the buckle element carried on the free end of the belt. The pawl is spring loaded through the remote control cable so that it normally is held in a position of disengagement relative to the ratchet plate. When the buckle element on the free end of the belt is coupled to the receiving buckle element or anchor device, the action of the spring on the cable is overcome and a weaker spring acting directly on the pawl drives the latter into engagement with the ratchet plate preventing rotation of the ratchet plate and the reel coupled thereto in unreeling direction. The belt is then positively and automatically held in its extended position. In the event that the belt is fully extended at the time the buckle element is engaged with the receiving buckle element, the spring loaded reel will cause the belt to be rewound until the slack is taken up. Upon rewinding rotation the ratchet plate merely cams the pawl out of holding position, a lost motion connection being provided between the remote control cable and the pawl to permit such ratcheting or camming action. As soon as the ratchet plate comes to a halt, the pawl will then drop into position preventing reverse or unwinding rotation of the ratchet plate and reel.

Other objects, advantages and features of this invention will be made more apparent as this description proceeds, particularly when considered in connection with the accompanying drawings, wherein.

Figure 1:
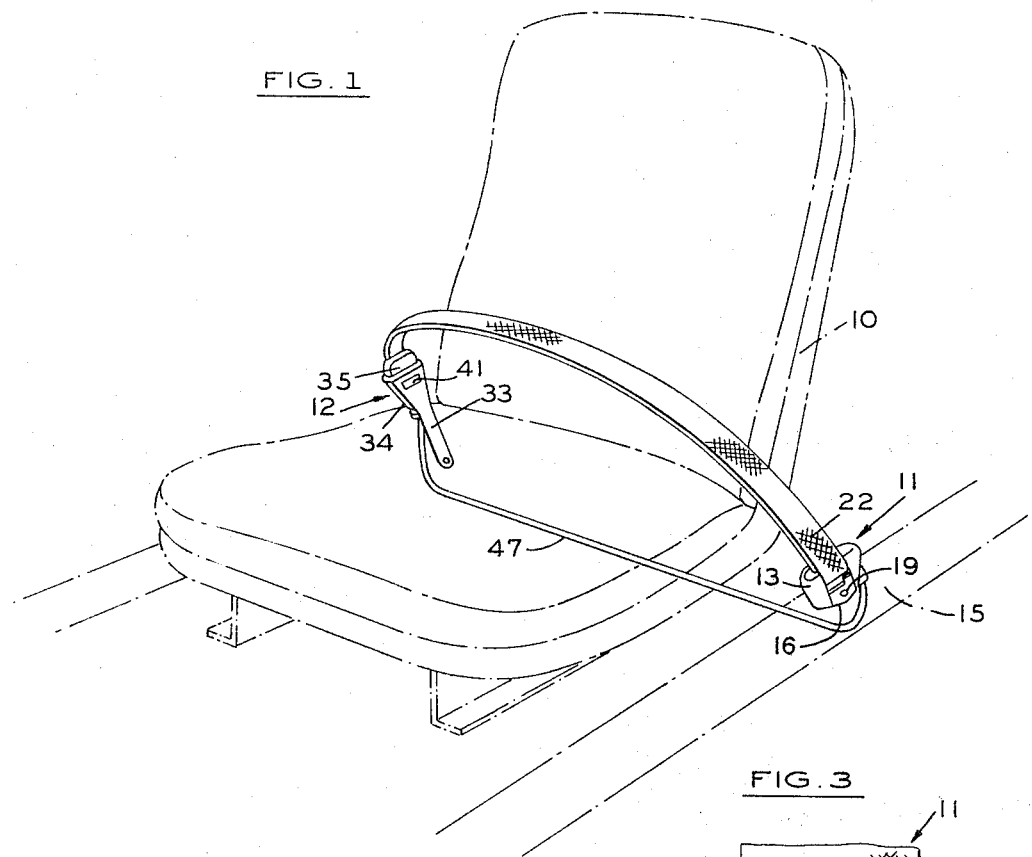
FIG. 1 is a perspective view illustrating the components of the seat belt retracting mechanism embodying the present invention as applied to a bucket type vehicle seat, the latter being shown in dot and dash outline.

Referring now to the drawings, FIG. 1 illustrates the general environment in which the seat belt retractor mechanism embodying the present invention is adapted to be used. The retractor mechanism is particularly adapted for use with a bucket type seat 10, the latter being indicated in dot and dash outline in FIG. 1. The retractor mechanism may be described as comprising two units—a reel unit, generally designated 11, and a buckle receiving unit, generally designated 12.

Figure 2:
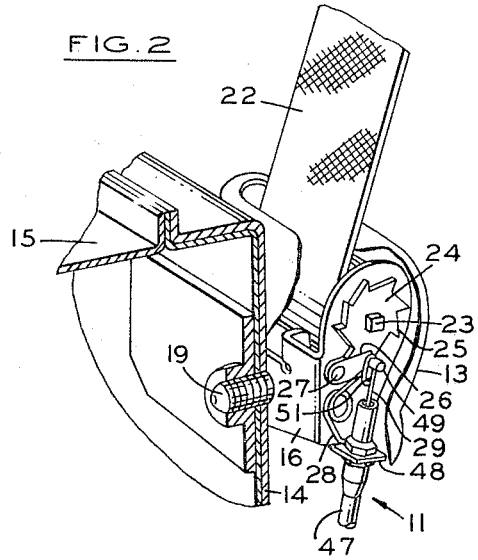
FIG. 2 is a fragmentary view in part sectional illustrating the components of the retractor mechanism located on the reel side of the system.
Figure 3:
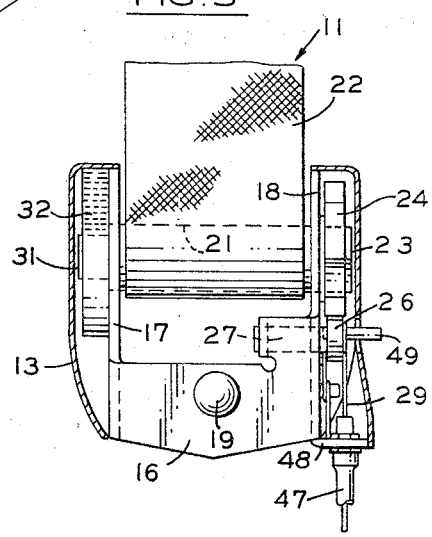
FIG. 3 is an enlarged elevation view in part sectional of the reel unit of the retractor mechanism.

As seen in FIGS. 2 and 3, the reel unit 11 comprises a reel housing 13 adapted to be mounted at one side of the bucket seat 10 on the wall 14 of a vehicle body sill 15. The reel housing 13 encompasses a support plate 16 having spaced flanges 17 and 18. The support plate 16 and the reel housing 13 are secured to the side wall 14 of the vehicle body sill 15 by means of a shoulder bolt 19.

Extending between the flanges 17 and 18 of the support plate is a reel or shaft 21 about which the seat belt 22 is adapted to be wound when retracted. The reel or shaft 21 has an end 23 projecting through the flange 18 on which is mounted a ratchet plate 24 having any desired number of abutments or projections 25.

A pawl 26 is cooperable with the ratchet plate 24 to hold the latter and thereby the reel 21 against rotation in belt unwinding direction, a clockwise direction as viewed in FIG. 2. The pawl 26 is carried on a pivot pin 27 projecting through the flange 18. A pawl spring 28 urges the pawl toward the ratchet plate 24. Disengagement of the pawl 26 from the ratchet plate 24 is accomplished by actuation of a control cable 29, as will be more fully explained.

The reel 21 has an end 31 projecting outwardly of the flange 17 of the support plate 16. A spiral spring 32 is coupled to the end 31 of the reel 21, and is arranged so that unreeling of the belt 22 from the reel 21 increases the windup or tension of the spring 32. Upon release of the pulling force on the belt 22, the spring will reverse the direction of rotation of the reel 21 causing the belt to rewind on the reel 21. The relationship of the ratchet plate abutments 25 to the pawl 26 is such that the pawl will not restrain rotation of the ratchet plate 24 in reel rewinding direction, the abutments 25 merely camming the pawl out of the path of the ratchet plate.

Figure 5:
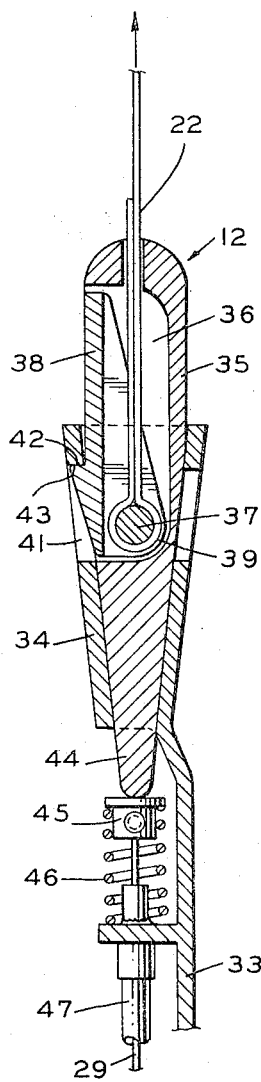
FIG. 5 is a sectional view taken on the line 5—5 of FIG. 4.
Figure 4:
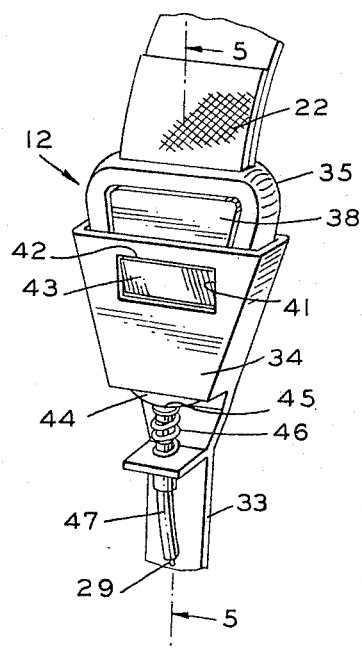
FIG. 4 is an enlarged perspective view illustrating components of the seat belt retractor mechanism located on the buckle side of the system.

Reference is now made to FIGS. 4 and 5 for an understanding of the manner in which the buckle assembly unit, generally designated 12, is constructed and arranged to coact with the reel unit as part of the belt retracting system. The buckle assembly unit comprises a bracket 33 having a receptacle 34 at its upper end. The receptacle 34 is adapted to receive a "spoon"-shaped buckle element 35. As best seen in FIGS. 4 and 5, the buckle element 35 has tapered sides and tapered front and rear faces and the receptacle 34 is correspondingly tapered so as to have what might be called a "bell mouth" shape. This provides an easy guide for insertion of the buckle element 35 in the receptacle. The buckle element 35 has a cavity 36 across which extends a shaft 37. The shaft 37 performs a dual function in that it provides a journal for a trigger 38 and also passes through a stitched loop 39 at the end of the belt. The receptacle 34 is provided with an aperture 41, the upper edge 42 of which functions as a keeper edge and coacts with a latching edge 43 on the trigger. The trigger might more appropriately be called a pivoted catch. The trigger 38 is preferably spring-loaded so that it will always be urged in an outward direction so that when the buckle element is inserted in the receptacle the latching edge 43 will engage the keeper edge 42 on the receptacle aperture 41.

It will be readily apparent that when the buckle element is in the position shown in FIG. 5, the buckle element cannot be withdrawn from the receptacle until the trigger is depressed to remove the interference between the latching edge 43 and the keeper edge 42. In the event of an accident or other sudden stoppage putting a load on the belt, the load taken by the belt will be fed directly into the trigger and the receptacle.

It will be noted that the lower end of the receptacle 34 is open and that the nose 44 of the buckle element is adapted to project a substantial distance below the lower edge of the receptacle 34. In so doing, the nose 44 of the buckle element 35 engages and depresses a button 45 carried on an end of the cable 29. When the button 45 is depressed to the position shown in FIG. 5, a spring 46 is compressed. When the buckle element 35 is withdrawn from the receptacle 34, the spring 46 will raise or restore the button 45 to a position just below the lower edge of the receptacle 34 thereby pulling on the cable 29. The cable 29 passes through a sheath 47 which passes beneath the vehicle seat 10 and then up to a flange 48 on the support plate 16 where it is anchored to the reel unit 11. The end of the cable 29 at the reel unit 11 end is operatively connected or coupled to the pawl 26. It will be noted that the pawl 26 has a laterally extending pin 49 at its free end and that the cable 29 has an axially elongated loop 51 hooked over this pin 49.

The operation of the seat belt retractor mechanism system embodying the present invention is as follows: The belt 22 when not in use will be completely retracted on the reel or shaft 21 with only the spoon 35 projecting above the reel housing 13. It will be noted there are two springs acting on the cable 29. One spring is the spring 46 which urges the button 45 and thereby the cable 29 toward the receptacle 34. The other spring is the spring 28 which acts on the pawl 27 to urge the latter and the loop 51 end of the cable 29 toward the ratchet plate 24. The system is designed so that the spring 46 is stronger than the spring 28 with the result that the pawl 26 is held out of engagement with the abutments 25 on the ratchet plate 24. The reel or shaft 21 is thereby freewheeling in either direction and the spring 32 is able to completely take up and cause complete retraction of the belt 22.

When a seat occupant desires to extend the belt across his body, he naturally will grasp the buckle element end to pull the belt across his body toward the receptacle 34 of the buckle element receiving unit 12. The only resistance that will be noted to this unreeling action will be the resistance of the spring 32 as the latter is wound up. Upon insertion of the buckle element 35 within the receptacle 34, the nose 44 of the buckle element will engage the button 45 and thereby push the cable 29 away from the receptacle 34. The force of the spring 46 is thus negated, and as the loop end 49 of the cable 29 is pushed toward the ratchet plate 24, the spring 28 is able to drive the pawl 26 into engagement with the abutments 25 on the ratchet plate 24. This prevents further unwinding of the reel 21 and provides a positive stop preventing further extension of the belt either when manually pulled upon or when pressure is exerted by the body of the seat occupant during a sudden vehicle stop or upon collision impact.

In the event that the belt 22 is overextended prior to the insertion of the spoon 35 into the receptacle 34, the spring 32 will automatically result in the belt being retracted since the reel is freewheeling at all times in a retracting direction. The profile of the abutments 25 on the ratchet 24 is such that as the spring winds the reel in belt retracting direction the abutments merely cam the pawl 26 toward disengaged position.

The loop 51 of the end of the cable 29 was described as being elongated axially of the cable and this longitudinal elongation permits lost motion between the loop 51 and the pin 49 carried on the end of the pawl 26.

Release of the belt from extended position as shown in FIG. 1 is accomplished simply by depressing the trigger 38 on the spoon 35 so that the latch edge 43 of the trigger is depressed below the keeper edge 42 at the upper edge of the aperture 41 in the receptacle 34. The rewinding force of the spring 32 will then cause the reel 21 to retract the belt to a fully wound position.

The pawl pin 49 is long enough to project through the reel housing 13 so that it may be manually manipulated in the event of spring failure or cable 29 failure.

It will be understood that the invention is not to be limited to the exact construction shown and described but that various changes and modifications may be made without departing from the spirit and scope of the invention, as defined in the appended claims.

I claim:
1. In combination:
a seat belt adapted to be extended across a vehicle seat, said seat belt having a buckle element at one end;
a reel unit adapted to be located at one side of a vehicle seat,
said reel unit comprising reel means to which the other end of said seat belt is attached,
said reel means being rotatably journalled for unwinding of said belt therefrom to extended condition and winding of said belt thereon to retracted condition,
and control means on said reel unit comprising a ratchet plate coupled to said reel means for rotation therewith and pawl means engageable with said ratchet plate to prevent rotation of said reel means in unwinding direction;
a buckle receiving means adapted to be located at the other side of the vehicle seat to receive said buckle element in extended condition of said belt;
transmitting means extending between said reel unit and buckle receiving means;

and a first spring means urging said pawl means into engagement with said ratchet plate, a second spring means forming a part of said transmitting means effective to negate the force of said first spring means in retracted condition of said belt, the force of said second spring means being negated by said transmitting means upon engagement of said buckle element with said buckle receiving means whereby said first spring means urges said pawl means into engagement with said ratchet plate to prevent unwinding of said reel means and extension of said belt.

2. In combination according to claim 1, in which:

the transmitting means comprises a cable housed within a sheath extending between the reel unit and buckle receiving means, the second spring means normally urges said cable in a direction to maintain said pawl means out of engagement with said ratchet plate, said buckle element engaging a part on said cable to urge the latter against the resistance of the second spring means in a direction to permit the first spring means to urge the pawl means into engagement with the ratchet plate for holding the latter against rotation in reel unwinding direction.

3. In a combination according to claim 2, in which:

the cable has a lost motion connection with the pawl means, the lost motion connection permitting ratcheting movement of the pawl means by the ratchet plate upon rotation of the reel means in belt winding direction.

4. In the combination according to claim 3, in which:

the reel unit includes a spring means coupled to the reel means urging the latter in belt winding direction after said belt had been unwound from the reel means thereby placing said last mentioned spring under increased tension.

References Cited by the Examiner

UNITED STATES PATENTS

| 2,468,560 | 4/1949 | Kirkpatrick | 297—388 |
| 2,708,555 | 5/1955 | Heinemann et al. | 242—107.4 |
| 3,147,996 | 9/1964 | Ferrara et al. | 297—388 |
| 3,248,148 | 4/1966 | Board et al. | 297—388 |

References Cited by the Applicant

UNITED STATES PATENTS 2,939,519   6/1960   McCall.

FRANK B. SHERRY, *Primary Examiner.*

CASMIR A. NUNBERG, *Examiner.*